United States Patent
Bokor et al.

(10) Patent No.: US 8,726,352 B2
(45) Date of Patent: *May 13, 2014

(54) ADMINISTRATION OF ACCESS CONTROL KEYS IN A VIRTUAL WORLD

(75) Inventors: Brian R. Bokor, Raleigh, NC (US); Andrew B. Smith, Morrisville, NC (US); Daniel E. House, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 930 days.

This patent is subject to a terminal disclaimer.

(21) Appl. No.: 11/935,556

(22) Filed: Nov. 6, 2007

(65) Prior Publication Data

US 2009/0119605 A1    May 7, 2009

(51) Int. Cl.
*H04L 29/00*      (2006.01)

(52) U.S. Cl.
USPC ............................... 726/4; 380/44; 715/757

(58) Field of Classification Search
USPC .......................... 715/757; 380/44; 726/18, 21
See application file for complete search history.

(56) References Cited

U.S. PATENT DOCUMENTS

| | | | | |
|---|---|---|---|---|
| 7,073,129 | B1 * | 7/2006 | Robarts et al. | 715/740 |
| 7,089,425 | B2 * | 8/2006 | Chan | 713/189 |
| 7,647,641 | B2 * | 1/2010 | Dubroeucq et al. | 726/27 |
| 7,680,268 | B2 * | 3/2010 | Lauter et al. | 380/28 |
| 2007/0013691 | A1 * | 1/2007 | Jung et al. | 345/419 |
| 2007/0156509 | A1 * | 7/2007 | Jung et al. | 705/10 |
| 2008/0091692 | A1 * | 4/2008 | Keith et al. | 707/100 |
| 2008/0177994 | A1 * | 7/2008 | Mayer | 713/2 |
| 2009/0116641 | A1 | 5/2009 | Bokor | |

OTHER PUBLICATIONS

USPTO, Non-Final Office Action issued in U.S. Appl. No. 11/935,567 on Oct. 29, 2010.
USPTO, Final Office Action issued in U.S. Appl. No. 11/935,567 on Apr. 4, 2011.
USPTO, Examiner's anwer issued in U.S. Appl. No. 11/935,567 on Dec. 16, 2011.

* cited by examiner

*Primary Examiner* — Ghazal Shehni
(74) *Attorney, Agent, or Firm* — Moore & Van Allen PLLC

(57) ABSTRACT

A system and method for access control key administration in a virtual world that includes identifying an action to be performed on a key provided to a user controlling an avatar in a virtual world. The key provides the avatar access to a virtual space, a service, or an item in the virtual world. The action is applied to the key. The action is applied to the key to modify one or more access parameters on the key. The action applied to the key may be, for example, an update action, a revalidate action, or a remove action.

16 Claims, 4 Drawing Sheets

ADMINISTRATION OF ACCESS CONTROL KEYS IN A VIRTUAL WORLD

BACKGROUND OF THE INVENTION

The present invention is related to access control keys, and more specifically to administration of access control keys in a virtual world.

Currently, in virtual world environments there exists a problem with minimal types of access control on users to private/controlled items, services, or areas within the virtual world. Users that control avatars in the virtual world that have been given access to an item a service or a virtual space. The access given is usually static unless a manual action is taken to remove their access. This does not allow for avatars to have temporary access to a given item, service, or virtual space based on a usage or time period.

BRIEF SUMMARY OF THE INVENTION

According to one aspect of the present invention, a method for access control key administration in a virtual world includes identifying an action to be performed on a key provided to a user controlling an avatar in a virtual world, the key providing the avatar access to a virtual space, a service, or an item in the virtual world, and applying the action to the key.

According to another aspect of the present invention, a system for access control key administration in a virtual world includes a server, one or more workstations, and a network interconnecting the server and one or more workstations, wherein the server hosts a virtual world allowing a user at the one or more workstations to control an avatar in the virtual world to use a key to access an item, a service, or a virtual space. An administrator may use the one or more workstations to perform access control key administration in the virtual world that includes identifying an action to be performed on a key provided to a user controlling an avatar in a virtual world, the key providing the avatar access to a virtual space, a service, or an item in the virtual world, and applying the action to the key.

According to a further aspect of the present invention, a computer program product comprises a computer useable medium having computer useable program code embodied therewith, the computer useable program code comprising computer useable program code configured to identify an action to be performed on a key provided to a user controlling an avatar in a virtual world, the key providing the avatar access to a virtual space, a service, or an item in the virtual world, and computer useable program code configured to apply the action to the key.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
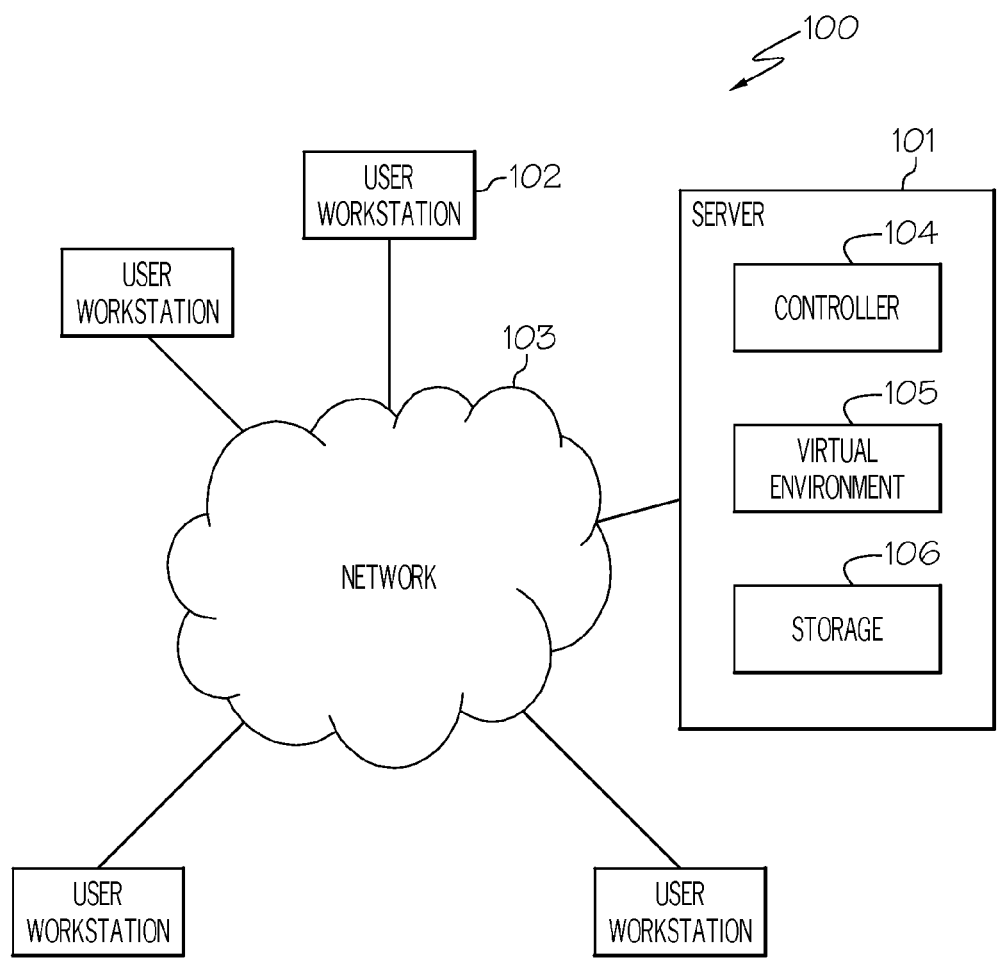
FIG. 1 is a diagram of system for access control key administration in a virtual world according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 shows a diagram of system for access control key administration in a virtual world according to an example embodiment of the present invention. The system 100 may include a server 101 and one or more workstations 102 where the server 101 and the one or more workstations 102 may be interconnected to a network 103. Although one server 101 is shown, there may be multiple servers connected to the network 103 and accessible by the one or more workstations 102. The server 101 may host the virtual environment 105 and also contain a controller 104 and storage 106. Therefore, a user at a workstation 102 may access the virtual environment 105 hosted on the server 101 and control an avatar in the virtual environment 105 to access a service, an item, or a virtual space. An owner or supplier of the service, the item, or the virtual space may also access the virtual world or environment 105, hosted on the server 101, via one or more workstations 102 and control an avatar to provide or restrict access to the service, the item, or the virtual space.

Figure 2:
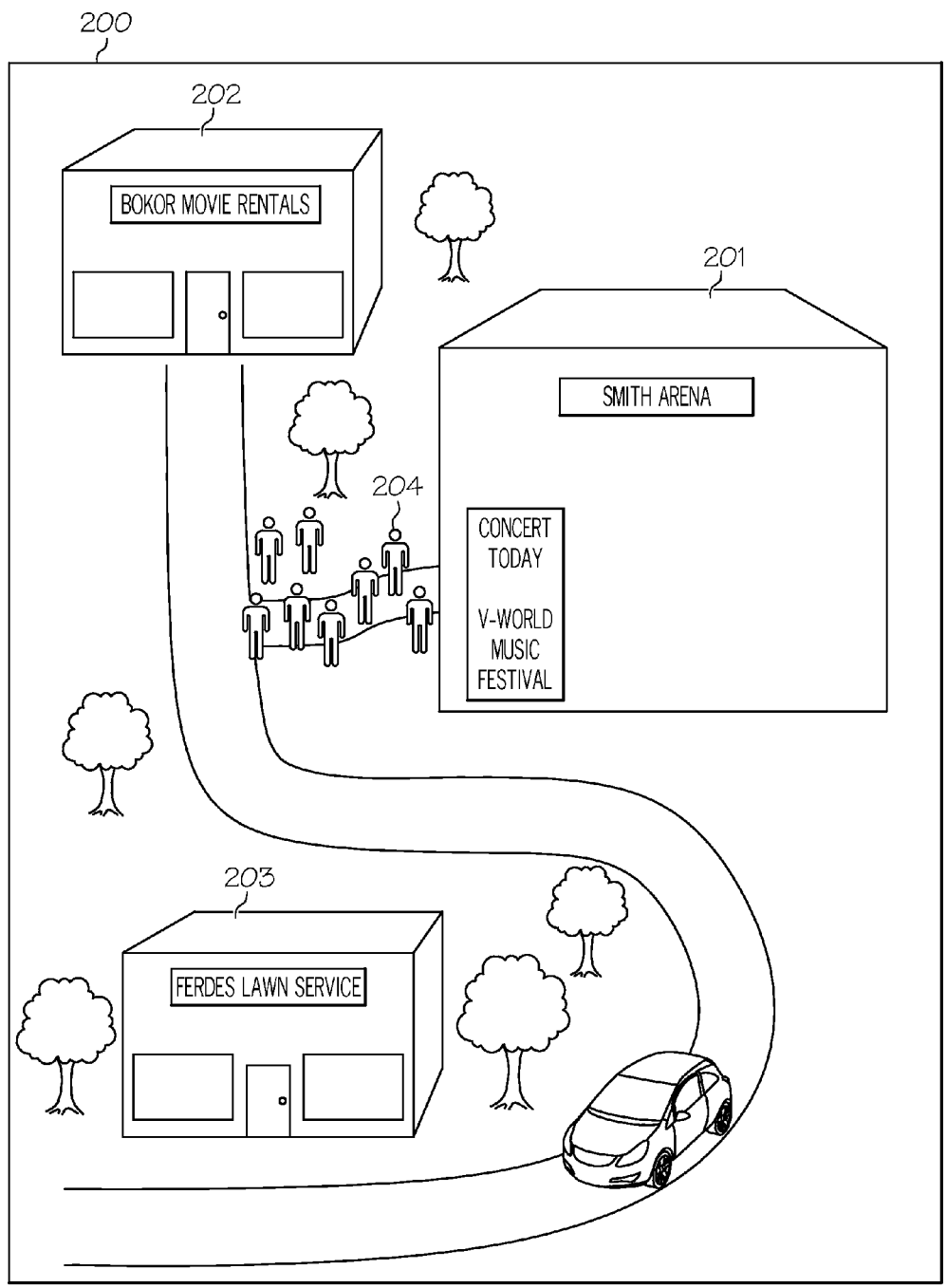
FIG. 2 is a diagram of virtual environment for access control key management according to an example embodiment of the present invention.

FIG. 2 shows a diagram of virtual environment for access control key management according to an example embodiment of the present invention. In the virtual environment/world 200 there may exist an environment containing buildings, stores, trees, cars, people (represented by avatars) and any other items that currently exist in the real world. For example, a virtual world may contain virtual businesses, stores, venues, or spaces 201, 202, 203 that allow an avatar 204 access to a service, an item, or a virtual space. Thus, the avatar may have purchased or otherwise obtained a key that provides a holder of the key with access to a service, an item, or a virtual space as defined by parameters of the key. These parameters may include, for example, a type parameter that may include a description and/or location of the service, the item, or the virtual space where access is allowed, a frequency parameter that may include information related to dates or repeating dates or periods that access is allowed, a duration parameter that may include specific time frames within the frequency that access is allowed, etc.

In this example embodiment, a user may have obtained a key that allows an avatar 204 of the user to access a virtual space "Smith Arena" 201 to view a music festival. The user may also obtain a key that allows the avatar access to an item, for example, a movie rental in a business "Bokor's Movie Rentals" 202, or a service, for example, a grass cutting service or a shrub maintenance service from a service provider "Ferdes Lawn Service" 203. The avatar's access is based on the parameters of the key providing the access and may be unlimited, or restricted to certain days of the week, times of the year or month, time durations, or hours of a day in accordance with the parameters. Should access expire, a user may request that the parameters on the key be updated to allow more access time. Moreover, according to embodiments of the present invention, the parameters may be updated manually of automatically by a controller of the access. For example, if a key has parameters allowing an avatar holder of the key access to a virtual space to attend a concert on a Friday, but the date of the concert has been moved to Saturday, the key parameters may be updated to revise the allowed access to be active on Saturday.

Figure 3:
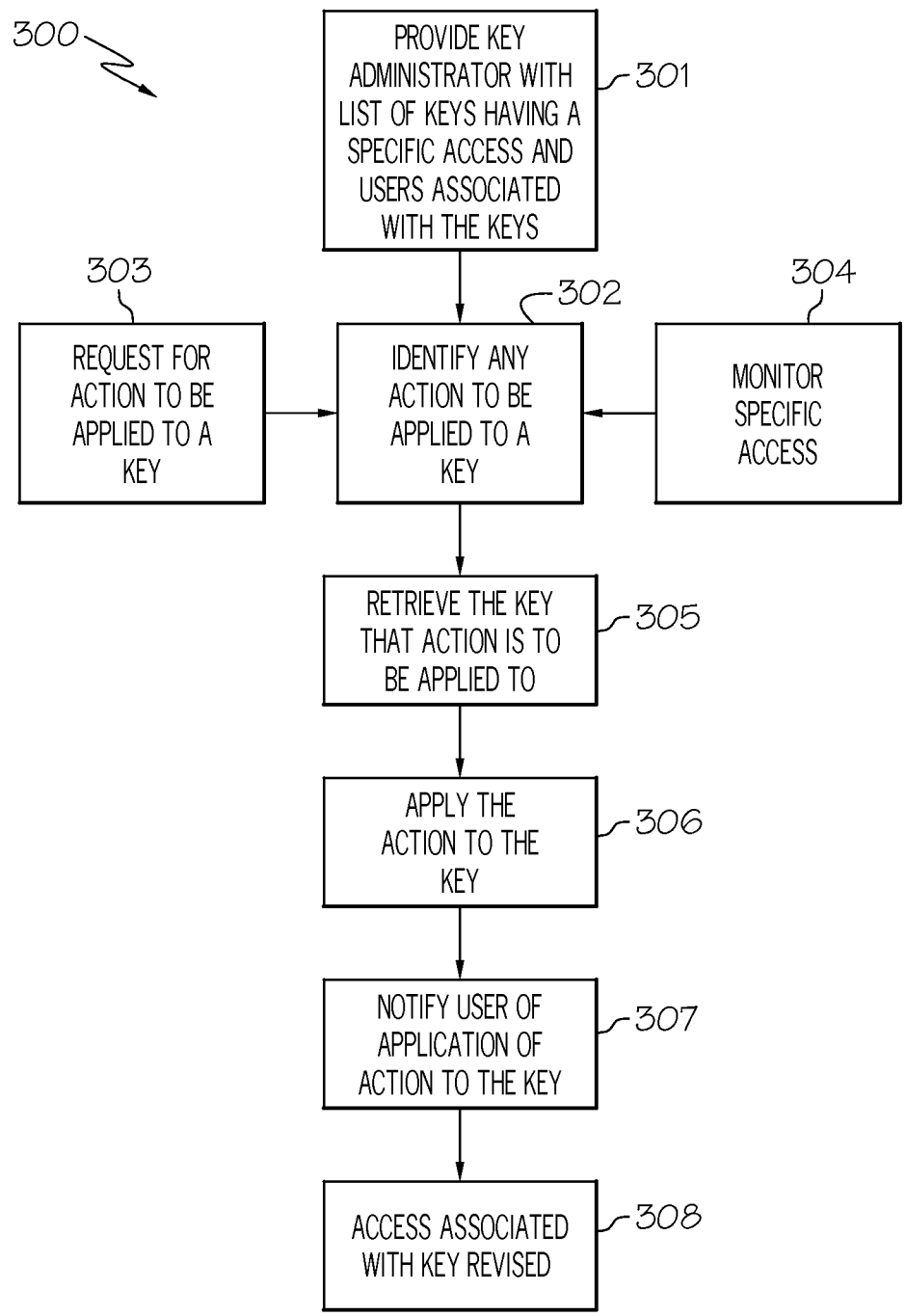
FIG. 3 is a flowchart of a process for access control key administration in a virtual world according to an example embodiment of the present invention.

FIG. 3 shows a flowchart of a process for access control key administration in a virtual world according to an example embodiment of the present invention. In the process 300, in block 301 a key administrator may be provided with a list of keys having a specific access to at least one of a virtual space, an item, or a service in a virtual world along with users associated with the keys. The list may be stored in a memory or a database. In block 302, any action to be applied to a key may be identified. Also, in block 303, a request for an action to be applied to a key may be generated and received by the administrator and then in block 302, any action to be applied to a key may be identified. Further, in block 304, the specific access to the virtual space, the item, or the service in the virtual world may be monitored and then in block 302, any action to be applied to a key may be identified. In block 305, the key that the action is to be applied to may be retrieved. The key may be retrieved form a memory, database, or from some other source. In block 306, the action may be applied to the key. In block 307, the user may be notified of application of the action to the key. In block 308, the access associated with key may be revised after application of the action.

Figure 4:
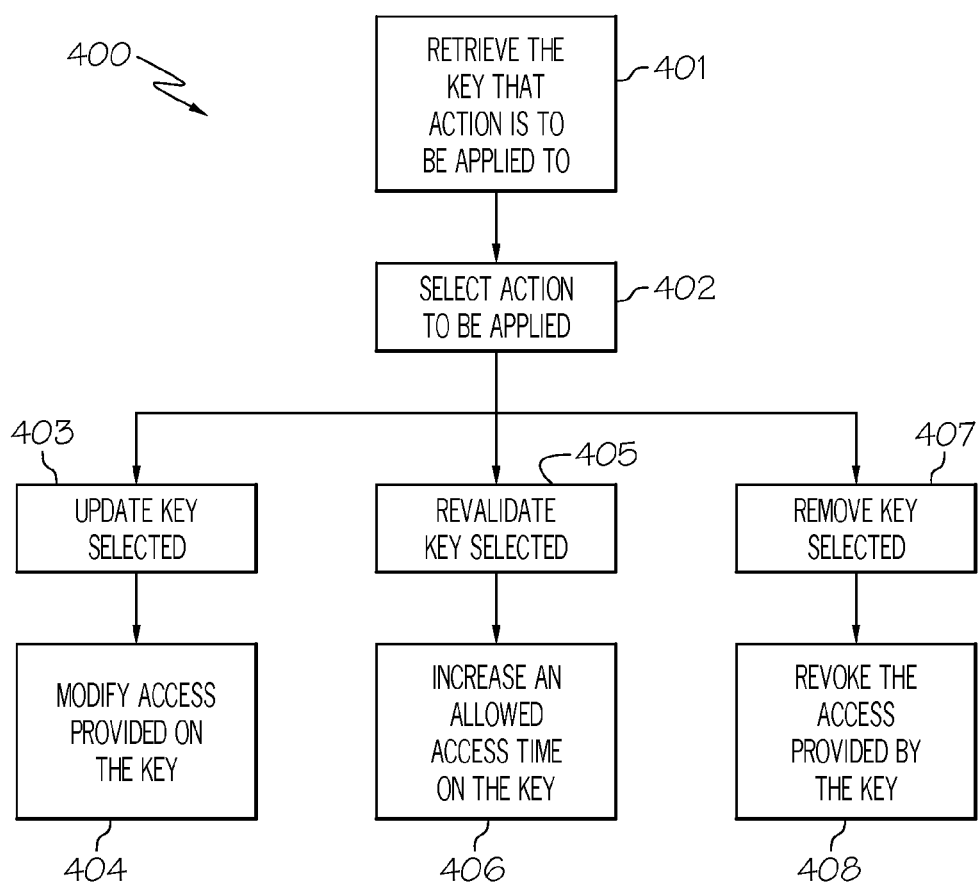
FIG. 4 is a flowchart of a process for applying an action to a key during access control key administration in a virtual world according to an example embodiment of the present invention.

FIG. 4 shows a flowchart of a process for applying an action to a key during access control key administration in a virtual world according to an example embodiment of the present invention. In the process 400, in block 401 the key that action is to be applied to may be retrieved. In block 402, an action to be applied may be selected. For example, in block 403, "update key" may be selected, or in block 405, "revalidate key" may be selected, or in block 407, "remove key" may be selected, etc. If in block 403, "update key" is selected, in block 404 an access provided on the key may be modified. If in block 405, "revalidate key" is selected, in block 406 an allowed access time provided by the key may be increased. If in block 407, "remove key" is selected, in block 408 an access provided by the key may be revoked.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for access control key administration in a virtual world comprising:
   providing a key to an avatar of a user in response to the avatar performing a predetermined function to obtain the key, the key being used by the avatar for access to at least one of a virtual space, service and item in the virtual world;
   identifying an action to be applied on the key provided to the avatar in the virtual world, the key having parameters in accord with the applied action for access to at least one of the virtual space, service and item in the virtual world by the avatar of the user under control of the user, wherein the parameters of the key comprise at least one of (a) a description of a service, an item, or virtual space, (b) a location of a service, an item, or virtual space, (c) a frequency including at least one of a date, repeating dates, and periods that access is allowed, and (d) a duration including time frames of a frequency in which access is allowed;
   providing, using a computer, the avatar access to at least one of the virtual space, the service, and the item in the virtual world in accord with the applied action to the key; and
   applying a revalidate action to the key to increase an allowed access time on the key for accessing the virtual space, the service, or the item in the virtual world.

2. The method according to claim 1, further comprising applying the action to the key to modify at least one access parameter on the key.

3. The method according to claim 1, further comprising applying an update action to the key.

4. The method according to claim 3, wherein the applying the update action to the key comprises modifying the access provided on the key.

5. The method according to claim 1, further comprising applying a remove action to the key.

6. The method according to claim 5, wherein the applying the remove action to the key comprises revoking the access to the virtual space, the service, or the item in the virtual world provided by the key.

7. The method according to claim 1, further comprising notifying the user of the application of the action to the key.

8. The method according to claim 1, further comprising receiving a request from the user to perform the action to be performed on the key.

9. The method according to claim 1, further comprising monitoring the virtual area, the service, or the item in the virtual world, and identifying the action to be performed on the key provided to the user responsive to the monitoring.

10. The method according to claim 1, further comprising retrieving the key from a plurality of stored keys before applying the action to the key.

11. A system comprising:
    a CPU processor configured for:
    providing a key to an avatar of a user in response to the avatar performing a predetermined function to obtain the key, the key being used by the avatar for access to at least one of a virtual space, service and item in the virtual world;
    identifying an action to be applied on the key provided to the avatar in the virtual world, the key having parameters in accord with the applied action for access to at least one of the virtual space, service and item in the virtual world by the avatar of the user under control of the user, wherein the parameters of the key comprise at least one of (a) a description of a service, an item, or virtual space, (b) a location of a service, an item, or virtual space, (c) a frequency including at least one of a date, repeating dates, and periods that access is allowed, and (d) a duration including time frames of a frequency in which access is allowed;
    applying the action to the key;
    providing the avatar access to at least one of the virtual space, the service, and the item in the virtual world in accord with the applied action to the key; and
    applying a revalidate action to the key to increase an allowed access time on the key for accessing the virtual space, the service, or the item in the virtual world.

12. The system according to claim 11, wherein the CPU processor is further configured for applying the action to the key to modify at least one access parameter on the key.

13. The system according to claim 11, wherein the CPU processor is further configured for modifying the access provided on the key.

14. A computer program product comprising a nontransitory computer readable storage medium, the computer program product configured to perform a method when executed by a computer, the method comprising:
    providing a key to an avatar of a user in response to the avatar performing a predetermined function to obtain the key, the key being used by the avatar for access to at least one of a virtual space, service and item in the virtual world;
    identifying an action to be applied on the key provided to the avatar in the virtual world, the key having parameters in accord with the applied action for access to at least one of the virtual space, service and item in the virtual world by the avatar of the user under control of the user, wherein the parameters of the key comprise at least one of (a) a description of a service, an item, or virtual space, (b) a location of a service, an item, or virtual space, (c) a frequency including at least one of a date, repeating dates, and periods that access is allowed, and (d) a duration including time frames of a frequency in which access is allowed;

applying the action to the key;

providing the avatar access to at least one of the virtual space, the service, and the item in the virtual world in accord with the applied action to the key; and applying a revalidate action to the key to increase an allowed access time on the key for accessing the virtual space, the service, or the item in the virtual world.

15. The computer program product of claim 14, wherein the method further comprises monitoring the virtual space, the service, or the item in the virtual world, and identifying the action to be performed on the key provided to the user responsive to the monitoring.

16. The computer program product of claim 14, wherein the method further comprises applying the action to the key to modify at least one access parameter on the key.

* * * * *